United States Patent
Shimizu et al.

(10) Patent No.: US 7,676,504 B2
(45) Date of Patent: Mar. 9, 2010

(54) DEVICE AND METHOD FOR PROCESSING CONTENT AND AN INFORMATION FILE RELATED TO THE CONTENT

(75) Inventors: Masahiro Shimizu, Saitama (JP); Manabu Kii, Tokyo (JP); Takamichi Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 524 days.

(21) Appl. No.: 10/969,556

(22) Filed: Oct. 20, 2004

(65) Prior Publication Data

US 2005/0086198 A1    Apr. 21, 2005

(30) Foreign Application Priority Data

Oct. 21, 2003    (JP)    ............................ P2003-360188

(51) Int. Cl.
*G06F 17/30* (2006.01)
(52) U.S. Cl. .................................... 707/203; 707/104.1
(58) Field of Classification Search ........................ None
See application file for complete search history.

(56) References Cited

U.S. PATENT DOCUMENTS 6,167,189 A * 12/2000 Taira et al. .................... 386/95
6,385,596 B1 * 5/2002 Wiser et al. .................... 705/51
6,832,293 B1 * 12/2004 Tagawa et al. .............. 711/115
2002/0046315 A1    4/2002 Miller et al.
2003/0182312 A1 * 9/2003 Chen et al. .................. 707/200

FOREIGN PATENT DOCUMENTS

| EP | 1 056 093 | 11/2000 |
| JP | 07-121449 | 5/1995 |
| JP | 1999-143753 | 5/1999 |
| JP | 2001-075598 | 3/2001 |
| JP | 2001-249694 | 9/2001 |
| JP | 2003-296185 | 10/2003 |
| WO | WO 02/097610 | 12/2002 |

* cited by examiner

*Primary Examiner*—John E Breene
*Assistant Examiner*—Thu-Nguyet Le
(74) *Attorney, Agent, or Firm*—Finnegan, Henderson, Farabow, Garrett & Dunner, L.L.P.

(57) ABSTRACT

It is possible for an information processing device to read or write a large amount of contents-related information more quickly if the device has a relatively small processing capacity. The file format identifier information and the block identifier information that correspond to contents-related information are identified in Step S11 and it is determined in Step S17 if the file format version information read out from the file identified by the file format identifier information and the predefined file format version information agree with each other or not. If it is determined that the two pieces of file format version information agree with each other, the related information is read out from the block identified by the block identifier information of the identified file according to the block position information of the identified file in Step S22.

5 Claims, 11 Drawing Sheets

DEVICE AND METHOD FOR PROCESSING CONTENT AND AN INFORMATION FILE RELATED TO THE CONTENT

BACKGROUND OF THE INVENTION

1. Field of the Invention

This invention relates to a device and a method for processing information, a recording medium, a computer program and contents-related data. More particularly, the present invention relates to a device and a method for processing information and a recording medium, and a computer program that are adapted to read or write contents-related information and also to such contents-related data.

This application claims priority of Japanese Patent Application No. 2003-360188, filed on Oct. 21, 2003, the entirety of which is incorporated by reference herein.

2. Related Background Art

It has been made possible to replay various contents of music, movie films, television programs and so on by means of various information processing devices including personal computers, PDAs (personal digital assistants) and portable players.

With such a device, contents may be managed in various different ways. For example, desired contents may be selected and replayed, sorted into groups or moved to some other device, while information relating to contents such as the names of players and the titles of contents may be edited. As contents are managed and manipulated in such ways, the information processing device that handles contents records information relating to the contents including the titles of the contents and the names of players and displays the recorded information on the display unit contained in it or an external display unit connected to it. A user of the information processing device may direct the information processing device to replay or move contents by referring to the information being displayed on the display unit.

The amount of information relating to contents has been increasing gradually in recent years. When a device having a relatively small information processing capacity such as a portable player handles information relating to contents, it can be time-consuming for it to retrieve and read desired information. A similar problem can arise for such a device to write desired information that relates to contents.

Consideration has not been paid satisfactorily to version ups of the data format of information relating to contents. When a version up becomes necessary for the data format, it has been a general practice to redefine the data format and carry out cumbersome processing operations of updating the firmware of the device correspondingly.

SUMMARY OF THE INVENTION

According to the invention, there is provided an information processing device for processing contents and a related information file relating to the contents;

the related information file including:

related information file format identifying information for identifying the format of the related information file; related information file version information indicating the version of the related information file; one or more than one related information blocks; number of related information blocks information indicating the number of the related information blocks; related information block identifying information for identifying each of the related information blocks; and related information block position information indicating the position of each of the related information blocks;

each of the related information blocks being made to include: related information block identifying information for identifying the block itself; and related information according to the related information block identifying information;

the device comprising:

a determining means for determining agreement or disagreement of the related information file version information contained in the related information file and the related information file version determining information predefined in the information processing device at the time of reading the related information contained in the related information file; and a reading means for reading the related information contained in the related information file according to the related information block identifying information or the related information position information contained in the related information file upon determining agreement of the related information file version information and the related information file version determining information.

In another aspect of the present invention, there is provided an information processing method of an information processing device for processing contents and a related information file relating to the contents;

the related information file including:

related information file format identifying information for identifying the format of the related information file; related information file version information indicating the version of the related information file; one or more than one related information blocks; number of related information blocks information indicating the number of the related information blocks; related information block identifying information for identifying each of the related information blocks; and related information block position information indicating the position of each of the related information blocks;

each of the related information blocks being made to include:

related information block identifying information for identifying the block itself; and related information according to the related information block identifying information;

the method comprising:

a determining step of determining agreement or disagreement of the related information file version information contained in the related information file and the related information file version determining information predefined in the information processing device at the time of reading the related information contained in the related information file; and a reading step of reading the related information contained in the related information file according to the related information block identifying information or the related information block position information contained in the related information file upon determining agreement of the related information file version information and the related information file version determining information.

In still another aspect of the present invention, there is provided a recording medium storing a computer-readable information processing computer program for processing contents and a related information file relating to the contents;

the related information file including:

related information file format identifying information for identifying the format of the related information file; related information file version information indicating the version of the related information file; one or more than one related information blocks; number of related information blocks information indicating the number of the related information blocks; related information block identifying information for identifying each of the related information blocks; and related information block position information indicating the position of each of the related information blocks;
each of the related information blocks being made to include:
related information block identifying information for identifying the block itself; and related information according to the related information block identifying information;
the computer program comprising:
a determining step of determining agreement or disagreement of the related information file version information contained in the related information file and the related information file version determining information predefined in the information processing device at the time of reading the related information contained in the related information file; and a reading step of reading the related information contained in the related information file according to the related information block identifying information or the related information block position information contained in the related information file upon determining agreement of the related information file version information and the related information file version determining information.

In still another aspect of the present invention, there is provided a computer program for causing a computer to execute an information processing computer program for processing contents and a related information file relating to the contents;
the related information file including:
related information file format identifying information for identifying the format of the related information file; related information file version information indicating the version of the related information file; one or more than one related information blocks; number of related information blocks information indicating the number of the related information blocks; related information block identifying information for identifying each of the related information blocks; and related information block position information indicating the position of each of the related information blocks;
each of the related information blocks being made to include:
related information block identifying information for identifying the block itself; and related information according to the related information block identifying information;
the computer program comprising:
a determining step of determining agreement or disagreement of the related information file version information contained in the related information file and the related information file version determining information predefined in the information processing device at the time of reading the related information contained in the related information file; and a reading step of reading the related information contained in the related information file according to the related information block identifying information or the related information block position information contained in the related information file upon determining agreement of the related information file version information and the related information file version determining information.

In still another aspect of the present invention, there is provided a contents-related data containing contents-related information;
the contents-related data including:
contents-related data format identifying information for identifying the format of the contents-related data; contents-related data version information indicating the version of the contents-related data; one or more than one related information blocks; number of related information blocks information indicating the number of the related information blocks; related information block identifying information for identifying each of the related information blocks; and related information block position information indicating the position of each of the related information blocks;
each of the related information blocks being made to include:
related information block identifying information for identifying the block itself; and related information according to the related information block identifying information.

Thus, the present invention makes it possible to read or write a large amount of contents-related information more quickly if the device has a relatively small processing capacity.

Additionally, the present invention is aimed to realize version up for the data format of contents-related information without requiring a cumbersome processing operation.

DETAILED DESCRIPTION OF THE PREFERRED EMBODIMENTS

Figure 1:
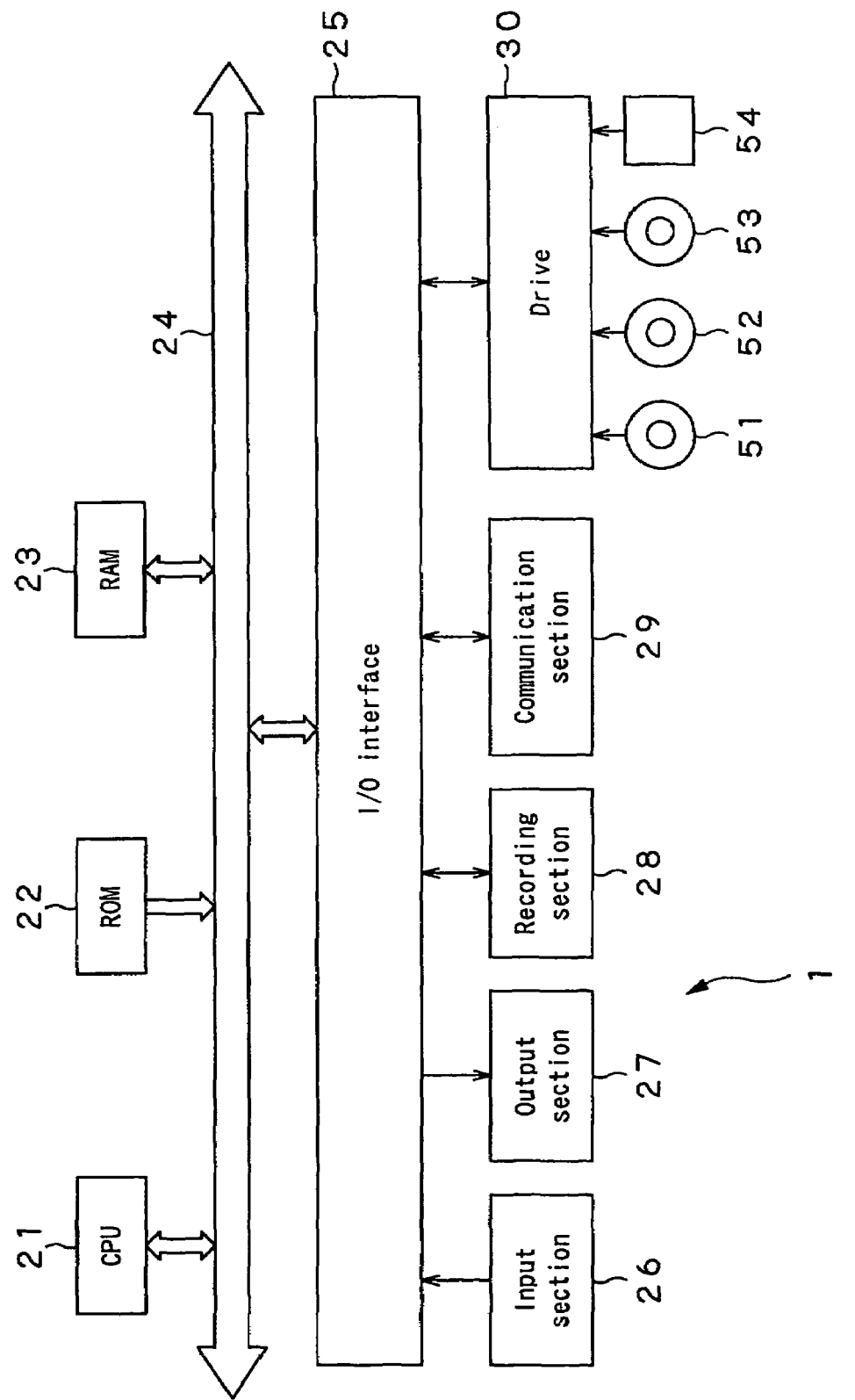
FIG. 1 is a schematic block diagram of an embodiment of the present invention, which is a portable player, showing its configuration.

Now, an embodiments of the present invention will be described by referring to the accompanying drawings. Firstly, the relationship between the present invention as defined in the appended claims and the embodiments of the invention will be described to make sure that the embodiments are described in this letter of specification to support the present invention as defined in the appended claims. However, if the relationship between any of the embodiments as described herein and the corresponding one or more than one of the appended claims is not specifically described below, it does not necessarily mean that the embodiment does not correspond to the specific one or more than one of the appended claims of the present invention. Conversely, if the relationship between any of the embodiments and the corresponding one or more than one of the appended claims is specifically described, it does not necessarily means that the embodiment does not correspond to any of the other appended claims of the present invention.

Furthermore, the following description does not necessarily define all of the present invention. In other words, this application does not negate new and/or additional claims of the present invention for patent that may appear as a result of divisional application and/or amendments to this application.

According to the invention, there is provided an information processing device. The information processing device (e.g., a portable player 1 of FIG. 1) comprises a recording control means (e.g., recording section 28 in FIG. 2) for controlling the records of files containing a predetermined number of blocks (e.g., blocks 162-1 through 162-N in FIG. 3) that are identified by a version and in which related information (e.g., block-dependent information in FIG. 7) and block identifying information (e.g., block identifier information in FIG. 7) are arranged, version information for identifying versions (e.g., major version information of file format version information 182 in FIG. 5), block position information indicating the positions of blocks (e.g., block position information in FIG. 6) and file format identifying information (e.g., file format identifier information 181 in FIG. 4) indicating that at least one of the blocks is contained, an identifying means (e.g., CPU 21 in FIG. 1 for executing the processing operation of Step S11 in FIG. 8) for identifying the file format identifying information and the block identifying information corresponding to the related information to be read out, a determining means (e.g., CPU 21 in FIG. 1 for executing the processing operation of Step S17 in FIG. 8) for determining if the version information read out from the file identified by the file format identifying information and the predefined version determining information (e.g., major version information of file format version information 122 in FIG. 2) agree with each other or not and a control means (e.g., CPU 21 in FIG. 1 for executing the processing operation of Step S22 in FIG. 8) for controlling the operation of reading the related information from the block identified by the block identifying information of the identified file according to the block position information of the identified file when the version information and the version determining information are determined to agree with each other.

The identifying means identifies the file format identifying information and the block identifying information corresponding to the related information to be read out (e.g., the processing operation of Step S41 in FIG. 9) and the information processing device may further comprise a write control means (e.g., CPU 21 in FIG. 1 for executing the processing operation of Step S53 in FIG. 9) for controlling the operation of writing the related information to the block identified by the block identifying information of the identified file according to the block position information of the filed identified by the file format identifying information when it is determined that the version information and the version determining information agree with each other.

The information processing device may further comprise an updating means (e.g., CPU 21 in FIG. 1 for executing the processing operation of Steps S56 through S59 in FIG. 10) for updating the identified file by adding a block and block position information to the file identified by the file format identifying information and updating the version information of the identified file when it is determined that the version information and the version determining information do not agree with each other so that the write control means causes to control the operation of writing the related information to the block identified by the block identifying information of the updated file according to the added block position information.

Figure 2:
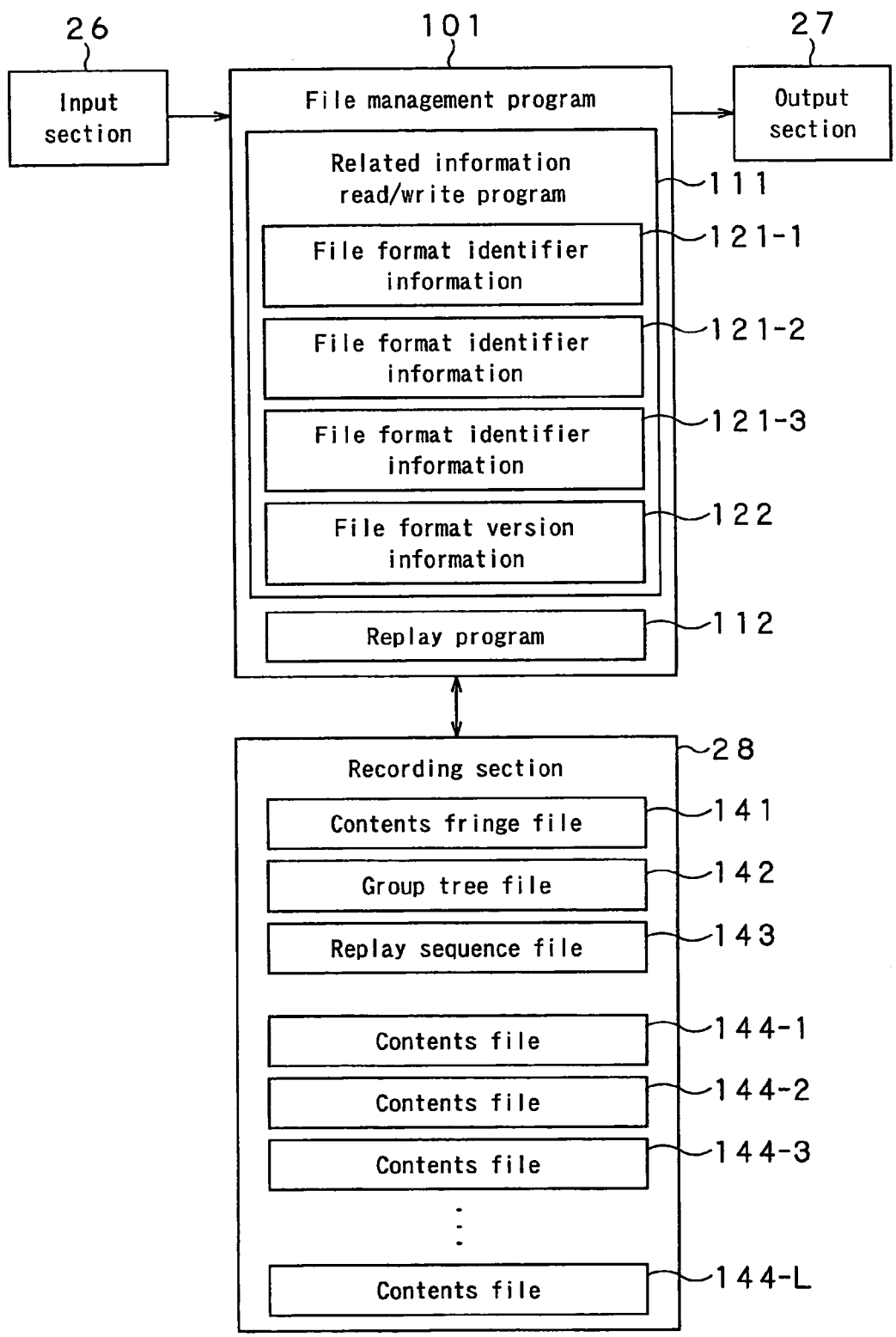
FIG. 2 is a schematic block diagram showing the function of the portable player.
Figure 4:
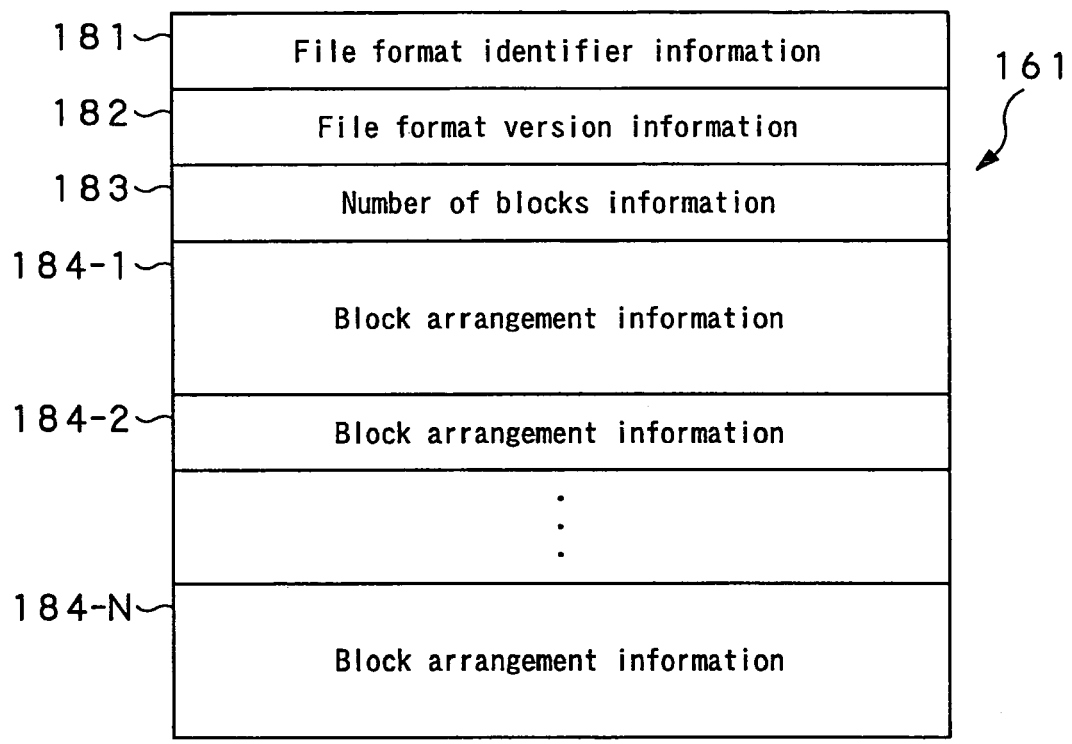
FIG. 4 is schematic illustration of the configuration of a file header.
Figure 5:
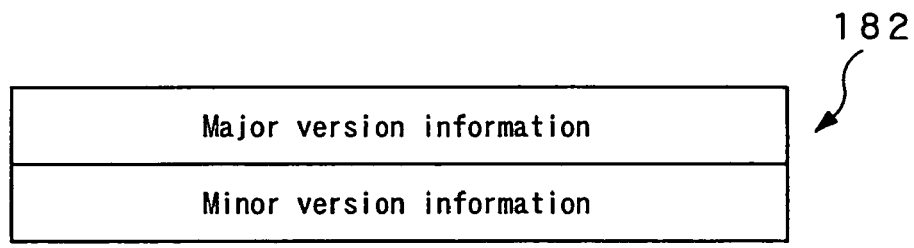
FIG. 5 is a schematic illustration of the configuration of file format version information.

Version information (e.g., file format version information 182 in FIG. 4) includes first version identifying information (e.g., major version information of the file format version information 182 in FIG. 5) and a second version identifying information (e.g., minor version information of the file format version information 182 in FIG. 5) that indicates a smaller change to the file format of the file relative to the first version identifying information and version determining information (e.g., file format version information 122 in FIG. 2) includes first version comparison information (e.g., major version information of the file format version information 122 in FIG. 2) and second version comparison information (e.g., minor version information of the file format version information 122 in FIG. 2). The determining means determines if the first version identifying information and the first version comparison information agree with each other or not and also if the second version identifying information and the second version comparison information agree with each other and the updating means causes to update the file when it is determined that the first version identifying information and the first version comparison information agree with each other and the second version identifying information and the second version comparison information do not agree with each other.

Version information (e.g., file format version information 182 in FIG. 4) includes first version identifying information (e.g., major version information of the file format version information 182 in FIG. 5) and a second version identifying information (e.g., minor version information of the file format version information 182 in FIG. 5) that indicates a smaller change to the file format of the file relative to the first version identifying information and version determining information (e.g., file format version information 122 in FIG. 2) includes first version comparison information (e.g., major version information of the file format version information 122 in FIG. 2) and second version comparison information (e.g., minor version information of the file format version information 122 in FIG. 2). The determining means determines if the first version identifying information and the first version comparison information agree with each other or not and the read control means causes to control the operation of reading the related information from the block identified by the block identifying information of the identified block according to the block position information of the identified file when it is determined that the first version identifying information and the first version comparison information agree with each other.

According to the invention, there is provided an information processing method. The information processing method comprises a recording control step (e.g., the processing operation of Steps S56 through S59 in FIG. 10) of controlling the records of files containing a predetermined number of blocks (e.g., blocks 162-1 through 162-N in FIG. 3) that are identified by a version and in which related information (e.g., block-dependent information in FIG. 7) and block identifying information (e.g., block identifier information in FIG. 7) are arranged, version information for identifying versions (e.g., major version information of file format version information 182 in FIG. 4), block position information indicating the positions of blocks (e.g., block position information in FIG. 6) and file format identifying information (e.g., file format identifier information 181 in FIG. 4) indicating that at least one of the blocks is contained, an identifying step (e.g., the processing operation of Step S11 in FIG. 8) of identifying the file format identifying information and the block identifying information corresponding to the related information to be read out, a determining step (e.g., the processing operation of Step S17 in FIG. 8) of determining if the version information read out from the file identified by the file format identifying information and the predefined version determining information (e.g., major version information of file format version information 122 in FIG. 2) agree with each other or not and a control step (e.g., the processing operation of Step S22 in FIG. 8) for controlling the operation of reading the related information from the block identified by the block identifying information of the identified file according to the block position information of the identified file when the version information and the version determining information are determined to agree with each other.

According to the invention, there is provided a computer program. The computer program is designed to execute a recording control step (e.g., the processing operation of Steps S56 through S59 in FIG. 10) of controlling the records of files containing a predetermined number of blocks (e.g., blocks 162-1 through 162-N in FIG. 3) that are identified by a version and in which related information (e.g., block-dependent information in FIG. 7) and block identifying information (e.g., block identifier information in FIG. 7) are arranged, version information for identifying versions (e.g., major version information of file format version information 182 in FIG. 4), block position information indicating the positions of blocks (e.g., block position information in FIG. 6) and file format identifying information (e.g., file format identifier information 181 in FIG. 4) indicating that at least one of the blocks is contained, an identifying step (e.g., the processing operation of Step S11 in FIG. 8) of identifying the file format identifying information and the block identifying information corresponding to the related information to be read out, a determining step (e.g., the processing operation of Step S17 in FIG. 8) of determining if the version information read out from the file identified by the file format identifying information and the predefined version determining information (e.g., major version information of file format version information 122 in FIG. 2) agree with each other or not and a control step (e.g., the processing operation of Step S22 in FIG. 8) for controlling the operation of reading the related information from the block identified by the block identifying information of the identified file according to the block position information of the identified file when the version information and the version determining information are determined to agree with each other.

The computer program can be recorded on a recording medium (e.g. magnetic disc 51 in FIG. 1).

According to the invention, there is provided a contents-related data. The contents-related data includes a predetermined number of blocks (e.g., blocks 162-1 through 162-N in FIG. 3) that are identified by a version and in which related information (e.g., block-dependent information in FIG. 7) and block identifying information (e.g., block identifier information in FIG. 7) are arranged, version information for identifying versions (e.g., file format version information 182 in FIG. 4), block position information indicating the positions of blocks (e.g., block position information in FIG. 6) therein and file format identifying information (e.g., file format identifier information 181 in FIG. 4) indicating that at least one of the blocks is contained.

The present invention can be applied to an information processing device for recording contents and contents-related information and handling the recorded contents-related information. The information processing device may be any device that can read or write contents-related information such as a personal computer, a PDA, a portable player or a stationary type DVD (digital versatile disc) recorder.

Now, the present invention will be described further by way of a portable player.

FIG. 1 is a schematic block diagram of an embodiment of the present invention, which is a portable player 1, showing its configuration. Referring to FIG. 1, CPU (central processing unit) 21 executes various processing operations according to the computer program stored in ROM (read only memory) 22 or recording section 28. RAM (random access memory) 23 stores various computer programs to be executed by the CPU 21 and data. The CPU 21, the ROM 22 and the RAM 23 are mutually connected by way of a bus 24.

The CPU 21 is also connected to an IO interface 25 by way of the bus 24. The IO interface 25 is connected to an input section 26 that may typically include a remote controller, switches and a microphone and an output section 27 that may typically include a display unit, a speaker and an earphone. The CPU 21 executes various processing operations in response to the command input by way of the input section 26. The CPU 21 outputs images, characters and sounds that are obtained as a result of the processing operations to the output section 27.

The recording section 28 connected to the IO interface 25 typically comprises a hard disc and is adapted to record the computer programs that the CPU 21 executes and various data (including contents and contents-related information). Communication section 29 is adapted to communicate with external devices such as personal computers by way of Internet and/or some other network or a communication medium.

The portable player may be so adapted to acquire computer programs by way of the communication section 29 and record them in the recording section 28.

Drive 30 that is connected to the IO interface 25 is adapted to drive a magnetic disc 51, an optical disc 52, a magneto-optical disc 53 or a semiconductor memory 54 and acquire one or more than one programs and/or data when any of such devices is mounted. The acquired programs and/or data are transferred to the recording section 28 and recorded there, if necessary.

FIG. 2 is a schematic block diagram showing the function of a portable player.

The CPU 21 of the portable player 1 executes file management program 101. The file management program 101 is a program for causing the CPU 21 to execute various processing operations for managing the files that contains contents.

The expression of contents as used herein refers to any information that is useful to the user. For instance, contents may be sound data (such as a piece of music), image data (such as still images or movie images), numerical data or programs. The expression of contents-related information as used herein refers to any information that shows a predetermined relationship relative to the contents. For instance, contents-related information may include the name or title of the contents, the name of the producer of the contents, the provider of the contents, the length of the contents (replay time), the performers of the contents and/or the name of the author of the original work.

For example, the file management program 101 may be a program that is executed by the portable player 1 to manage recorded musical contents, select musical contents and replay the selected musical contents. Alternatively, the file management program 101 may be a program that is executed by the portable player 1 to manage recorded movie contents, select movie contents and replay the selected movie contents.

The file management program 101 includes a related information read/write program 111 and a replay program 112.

The related information read/write program 111 is adapted to read or write contents-related information. For example, the related information read/write program 111 may read contents-related information stored in the recording section 28 or write contents-related information to the recording section 28. The related information read/write program 111 may typically display the contents-related information it reads out on the output section 27.

The replay program 112 is adapted to replay contents. For example, the replay program 112 may replay the contents whose related information is read out by the related information read/write program 111.

Contents and contents-related information are recorded in the recording section 28 of the portable player 1.

More specifically, contents fringe file 141 or a contents file 144-L is recorded in the recording section 28.

The contents fringe file 141 stores contents-related information. The contents fringe file 141 is a file for centrally recording and managing attribute information of all the contents recorded in the recording section 28. If, for example, contents are pieces of music, the contents fringe file 104 operates as a file for centrally recording and managing attribute information of all the pieces of music.

More specifically, the contents fringe file 141 stores (information indicating) the titles of the pieces of music, or the contents, (information indicating) the names of the artists, who may be the composers or the players of the musical compositions, or the contents, (information indicating) the labels showing the names of the providers (so-called record producers in terms of copy right law) who provide the pieces of music, or the contents, (information indicating) the genres of the musical compositions, or the contents, (information indicating) contents-related information including the release dates of the pieces of music, or the contents and so on.

Group tree file 142 stores data necessary for controlling the operation of displaying contents-related information. For example, the group tree file 142 stores contents-related information such as information relating to classifying contents into groups and data that indicate the tree structures of the groups (group tree data) into which contents are classified. Groups are sets of contents (or contents files).

For example, a group may be expressed by the contents that belong (or the contents file that belongs) to the group.

More specifically, for instance, the group tree file 142 stores information that indicates the depth of the group, which is a node on the tree of the groups, into which contents are classified, information indicating the first content to be replayed of the group and the sequence of replaying the contents of the group.

The depth indicates the distance from the root of the three to the group that arises when the tree (structure) of groups is generated. The depth of the group is the depth of the group, or the node, on the tree. In other words, the depth of the group indicates the depth of the layer to which the group belongs in the hierarchical structure of the three of groups. The depth of the layer immediately below the root is defined as 1 and the depth increases as the layer goes down.

The root as used herein refers to the root of a rooted tree in the graph theory.

The three of group is utilized to manage contents or groups. The expression of management as used herein refers to operations for displaying, selecting, editing or otherwise modifying contents-related information such as titles of contents and/or groups-related information such as names of groups and those for moving contents.

The portable player 1 can manage groups by means of a hierarchical structure by utilizing the data indicating the tree structure of groups stored in the group tree file 142.

Replay sequence file 143 stores contents-related information that indicates the sequence (order) in which contents are replayed. For example, the replay sequence file 143 stores contents-related information such as information indicating the piece of music that is the content to be replayed first and fringe information of the content to be replayed first.

Contents files 144-1 through 144-L stores respective contents. For example, the contents files 144-1 through 144-L may store contents that are pieces of music or images that may be still images or movie images.

It may alternatively be so arranged that the contents files 144-1 through 144-L store contents of different sorts.

The related information read/write program 111 controls the operation of recording the contents fringe files 141 or the replay sequence file 143 to the recording section 28. For example, the related information read/write program 111 may read out contents-related information from the contents fringe file 141 or the replay sequence file 143 or write contents-related information to the contents fringe file 141 or the replay sequence file 143.

The related information read/write program 111 stores file format identifier information 121-1 through 121-3 and file format version information 122. For example, the file format identifier information 121-1 through 121-3 and the file format version information 122 are recorded (stored) in a predetermined region of the recording section 22 or the ROM 22 that is managed by the related information read/write program 111.

The file format identifier information 121-1 through 121-3 are pieces of information for identifying files that store contents-related information and which the related information read/write program 111 can handle. For example, the file format identifier information 121-1 is a piece of information for identifying the contents fringe file 141 and the file format identifier information 121-1 is a piece of information for identifying the group tree file 142, while the file format identifier information 121-3 is a piece of information for identifying the replay sequence file 143.

The file header of the contents fringe file 141 stores file format identifier information that corresponds to the file format identifier information 121-1 and the file header of the group tree file 142 stores file format identifier information that corresponds to the file format identifier information 121-2, while the file header of the replay sequence file 143 stores file format identifier information that corresponds to the file format identifier information 121-3.

Thus, when the related information read/write program 111 reads information from or write information to a file storing contents-related information such as the contents fringe file 141, the group tree file 142 or the replay sequence file 143, it can determine if it can handle the file by comparing the file format identifier information stored in the file header and the pieces of file format identifier information 121-1 through 121-3 it has.

The file format version information 122 is a piece of information for identifying the version of the file that stores contents-related information and which the related information read/write program 111 can handle.

The file header of the contents fringe file 141 or the replay sequence file 143 stores file format version information corresponding to the file format version information 122.

When the related information read/write program 111 reads information from a file storing contents-related information such as the contents fringe file 141, the group tree file 142 or the replay sequence file 143, it can determine if it can handle the file by comparing the file format version information stored in the file header and the file format version information 122 it has.

If it is not necessary to discriminate the pieces of file format identifier information 121-1 through 121-3, they will collectively be referred to as file format identifier information 121 hereinafter.

The related information read/write program 111 does not necessarily store three pieces of file format identifier information 121. In other words, it can store less than three pieces of file format identifier information 121 or four or more than four pieces of file format identifier information 121.

Now, the configuration of the files for storing contents-related information such as the contents fringe file 141, the group tree file 142 and the replay sequence file 143 will be described by referring to FIGS. 3 through 7.

Figure 3:
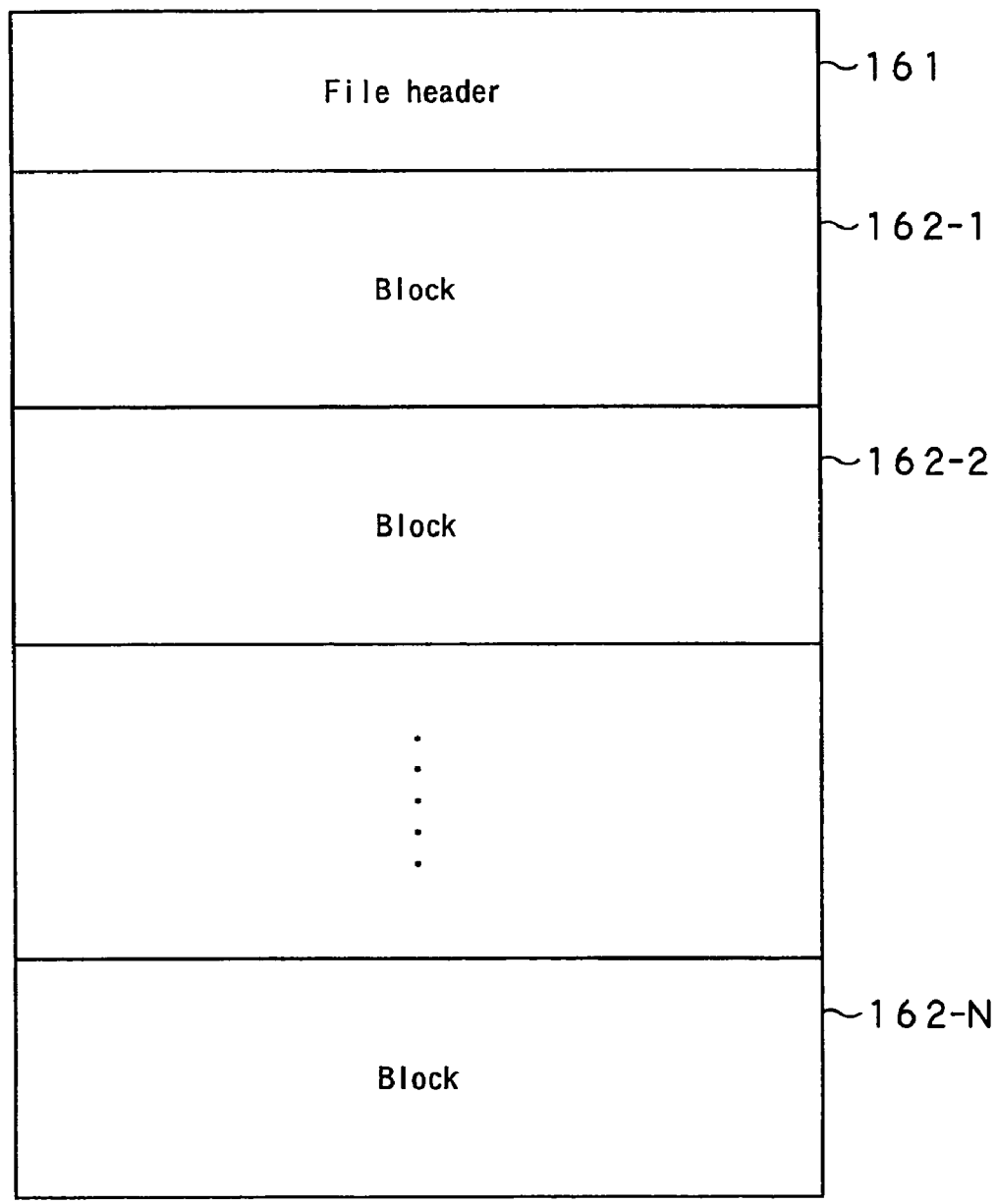
FIG. 3 is a schematic illustration of the configuration of a file for storing contents-related information.

As shown in FIG. 3, a file for storing contents-related information includes a file header 161 for storing data to be used for handling the file and blocks 162-1 through 162-N for storing contents-related information.

The number of blocks for storing contents-related information is N and the blocks include block 162-1 through 162-N in the instance illustrated in FIG. 3. N may be any desired integer not smaller than 1.

If it is not necessary to discriminate the blocks 162-1 through 162-N, they will collectively be referred to as blocks 162.

The number of blocks 162 of in a file and the type of data stored in each block 162 (configuration of the block 162) are determined according to the file format identifier information (which will be described in greater detail hereinafter) and the file format version information (which will also be described in greater detail hereinafter) arranged in the file header 161.

Two blocks 162 of a file may store respective pieces of information of the same type. Alternatively, the blocks 162 of a file may store respective pieces of information of different types.

FIG. 4 schematically illustrates the configuration of a file header 161. The file header 161 stores file format identifier information 181, file format version information 182, number of blocks information 183 and pieces of block arrangement information 184-1 through 184-N.

The file format identifier information 181 is utilized to identify a file, or the information stored in the file. For example, the related information read/write program 111 determines if the file format identifier information 181 agrees with any of the pieces of file format identifier information 121-1 through 121-3 and, if it determines that the file format identifier information 181 agrees with one of the pieces of file format identifier information 121-1 through 121-3, it handles the file that stores the file format identifier information 181.

The file format version information 182 indicates the version of the file. For example, the related information read/write program 111 compares the file format version information 122 and the file format version information 182 and determines the operation to be conducted on the file that stores the file format version information 182 according to the outcome of the comparison.

The number of blocks information 183 is a piece of information that indicates the number of blocks 162 that a file contains. For example, if a file contains N blocks 162, N is defined for the number of blocks information 183.

The pieces of block arrangement information 184-1 through 184-N are pieces of information that indicate the respectively positions of the blocks 162-1 through 162-N in a file. For example, the block arrangement information 184-1 indicates the position of the block 162-1 in a file and the block arrangement information 184-2 indicates the position of the block 162-2 in a file. Similarly, the block arrangement information 184-3 through 184-N indicate the respective positions of the blocks 162-3 through 162-N in a file.

The number of pieces of block arrangement information 184-1 through 184-N and the number of blocks 162-3 through 162-N in a file agree with each other.

If it is not necessary to discriminate the pieces of block arrangement information 184-1 through 184-N, they will collectively be referred to as block arrangement information 184 hereinafter.

FIG. 5 schematically illustrates the configuration of file format version information 182. The file format version information 182 includes major version information and minor version information. The major version information is typically the value of an integer not smaller than 0. The minor version information is typically the value of an integer not smaller than 0.

The file formats of files are same if the files have the same file format identifier information and show the same major version as indicated by the respective pieces of major version information and the same minor version as indicated by the respective pieces minor version information. The file formats of files are different from each other if the files have same file format identifier information but show different major versions as indicated by the respective pieces of major version information and different minor versions as indicated by the respective pieces of minor version information.

Thus, the major version as indicated by major version information and the minor version as indicated by minor version information show agreement or disagreement of the file formats of files having same file format identifier information.

Minor version information indicates a change to the file format that is smaller than the change indicated by major version information. The expression that the change to the file format is small refers to that the file format has more common attributes before and after the change.

Like the file format version information 182, the file format version information 122 includes major version information and minor version information.

Figure 6:
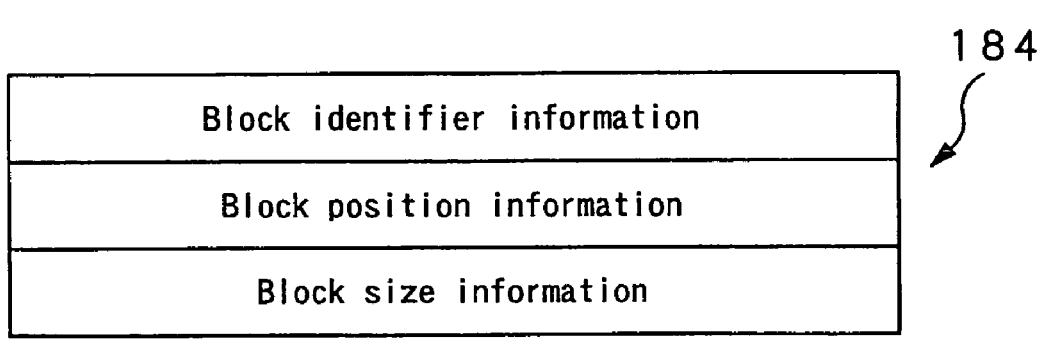
FIG. 6 is a schematic illustration of the configuration of block arrangement information.

FIG. 6 is a schematic illustration of the configuration of block arrangement information 184. Block arrangement information 184 includes block identifier information, block position information and block size information.

Block identifier information is utilized to identify the block 162 that corresponds to the block arrangement information 184 or the information stored in the block 162. For example, the related information read/write program 111 identifies the block 162 that stores the information to be read or the information to be written according to the block identifier information.

For example, the block identifier information of the block arrangement information 184-1 is utilized to identify the information stored in the block 162-1. The block identifier information of the block arrangement information 184-2 is utilized to identify the information stored in the block 162-2. Similarly, the pieces of block identifier information of the pieces of block arrangement information 184-3 through 184-N are utilized to respectively identify the pieces information stored in the blocks 162-3 through 162-N.

Block position information is a piece of information that indicates the position of a block 162 in a file.

More specifically, the block position information of the block arrangement information 184-1 indicates the number of bytes from the head of the file to the head of the block 162-1 and the block position information of the block arrangement information 184-2 indicates the number of bytes from the head of the file to the head of the block 162-2. Similarly, the pieces of block position information of the pieces of block arrangement information 184-3 through 184-N indicate the respective numbers of bytes from the head of the file to the heads of the blocks 162-3 through 162-N.

Block size information is a piece of information that indicates the size of a block 162.

More specifically, the block size information of the block arrangement information 184-1 indicates the size of the block 162-1 expressed in terms of number of bytes and the block size information of the block arrangement information 184-2 indicates the size of the block 162-2 expressed in terms of number of bytes. Similarly, the pieces of block size information of the pieces of block arrangement information 184-3 through 184-N indicate the respective sizes of the blocks 162-3 through 162-N expressed in terms of number of bytes.

Figure 7:
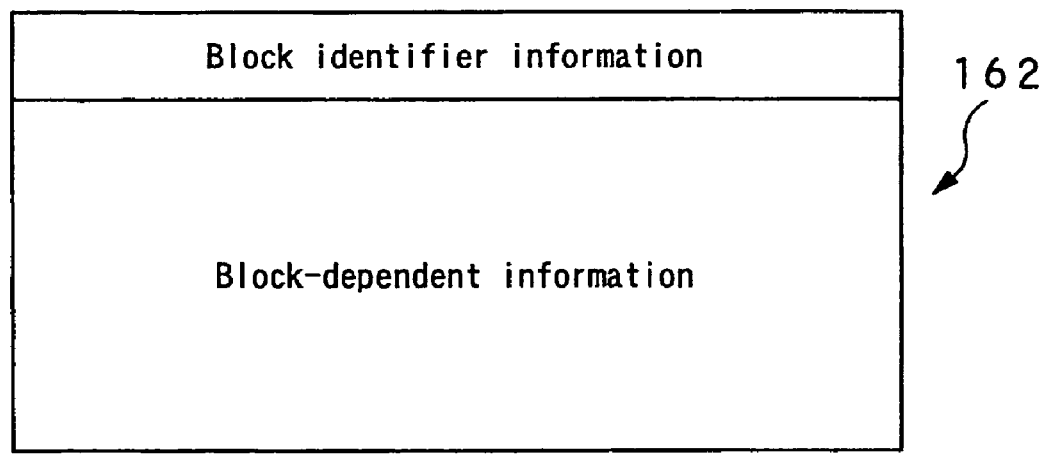
FIG. 7 is a schematic illustration of the configuration of a block.

FIG. 7 is a schematic illustration of the configuration of a block 162. As shown in FIG. 7, block identifier information and block-dependent information are arranged in the block 162.

The block identifier information arranged in the block 162 agrees with the block identifier information of the corresponding block arrangement information 184. For example, the block identifier information arranged in the block 162-1 agrees with the block identifier information of the corresponding block arrangement information 184-1 and the block identifier information arranged in the block 162-i agrees with the block identifier information of the corresponding block arrangement information 184-i.

Block-dependent information is data on the blocks 162 other than the block identifier information that are stored in the respective blocks 162. It is contents-related information.

The contents-related information that is the block-dependent information stored in the blocks 162 may include information on the contents that are pieces of music, information on the groups of pieces of music, device information and medium information. Device information as used herein refers to information relating the hardware or firmware of the portable player 1. Medium information as used herein refers to information relating to the recording medium storing the contents. For example, the medium information may be information indicating the type and the recording capacity or available capacity of the recording medium, or the recording section 28.

The data structure of block-dependent information to be used for storing desired information as data is defined and a value of the block identifier information is assigned to the defined block-dependent information. Thus, the data structure of block-dependent information is identified by block identifier information.

For example, to define blocks 162 for storing all the titles, the names of the artist and other additional information relating to the contents recorded in a recording medium, which may be the recording section 28, the data structure of the block-dependent information for the blocks storing contents-related information is defined and a specific value is assigned to the defined block-dependent information as block identifier information so that the blocks 162 are defined as musical composition information blocks for storing contents-related information.

Thus, the file format of the file is defined as a predetermined value is assigned to the file format identifier information 181 for a combination of blocks 162 that is defined in a manner as described above.

When extending the file format that is already defined, the major version information or the minor version information of the file format version information 182 is redefined. When increasing the value of the major version information, the file format that is already defined is redefined without taking compatibility into consideration. When, on the other hand, increasing the value of the minor version information, the file format is extended while securing the lower compatibility of the file format that is already defined. Extension of the file format, or version up of the file will be described in greater detail hereinafter.

Figure 8:
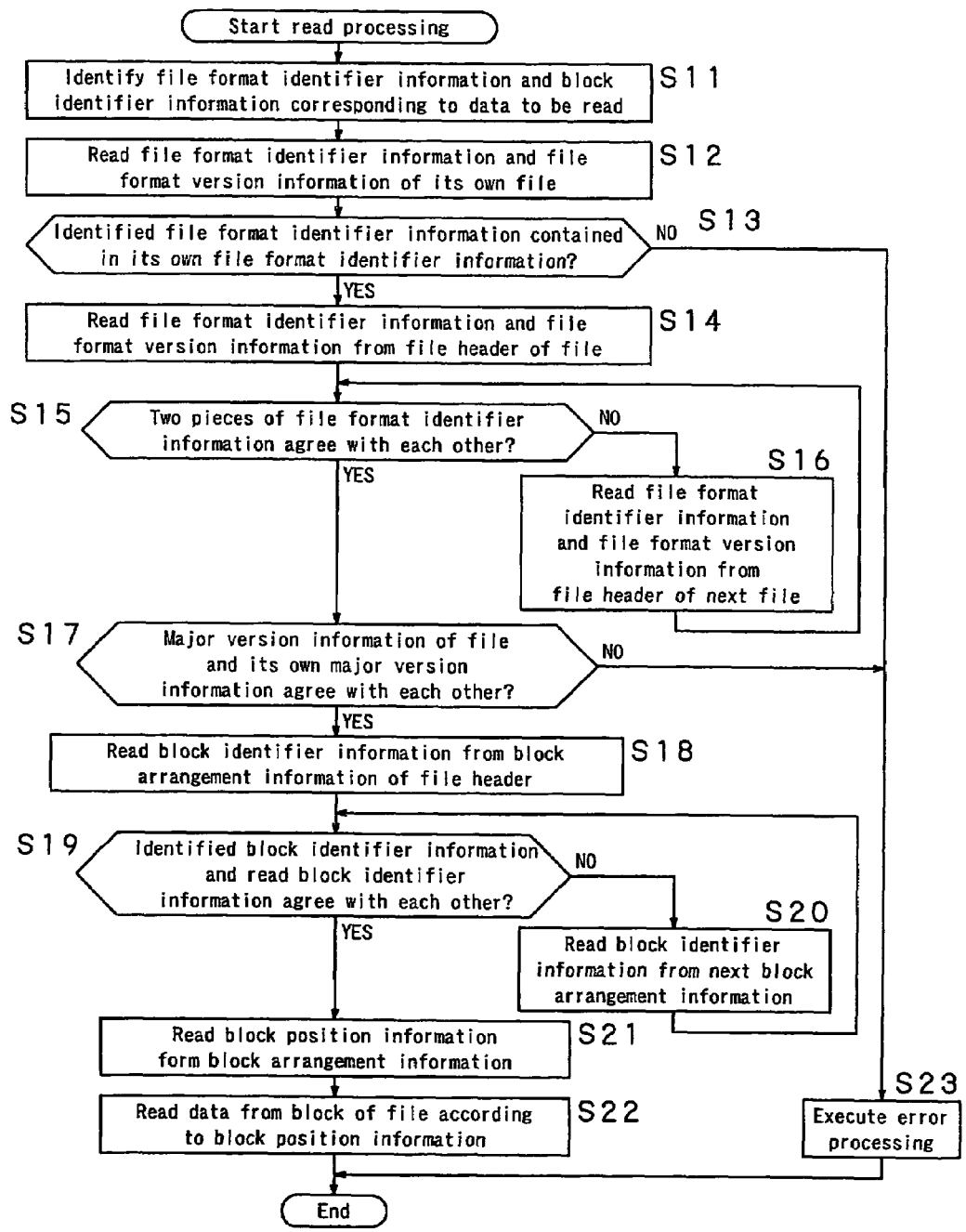
FIG. 8 is a flow chart of processing an operation of reading contents-related information.

FIG. 8 is a flow chart of the operation of the CPU 21 for executing the file management program 101, illustrating the processing operation for reading contents-related information. Referring to FIG. 8, firstly in Step S11, the related information read/write program 111 of the file management program 101 identifies the file format identifier information and the block identifier information that correspond to the data to be read out (contents-related information).

For example, the related information read/write program 111 stores in advance data that indicates the correspondence of the data to be read out (contents-related information) to the file format identifier information and the block identifier information so that it identifies the file format identifier information and the block identifier information that correspond to the data to be read out (contents-related information) according to the stored data.

In Step S12, the related information read/write program 111 reads out the file format identifier information and the file format version information stored in it. For example, the related information read/write program 111 may read out the file format identifier information 121-1 through 121-3 and the file format version information 122 in Step S12.

Then, in Step S13, the related information read/write program 111 determines if the file format identifier information identified by the processing operation of Step S11 is contained in the file format identifier information read out from itself in Step S12 or not. If it is determined in Step S13 that the identified file format identifier information is contained in its own file format identifier information, the related information read/write program 111 proceeds to Step S14, where it reads out the file format identifier information 181 and the file format version information 182 from the file header 161 of the first file because it can handle the file storing the data to be read out.

Then in Step S15, the related information read/write program 111 determines if the file format identifier information identified by the processing operation of Step S11 agrees with the file format identifier information 181 read out from the file or not. If it is determined that the they do not agree with each other, the related information read/write program 111 proceeds to Step S16, where it reads out the file format identifier information 181 and the file format version information 182 from the file header 161 of the next file because the data to be read out is not contained in the file. Then, the related information read/write program 111 returns to Step S15 and repeats the processing operation of determining agreement or disagreement and that of reading out until it find out that the identified file format identifier information agrees with the read out file format identifier information 181.

If it is determined in Step S15 that the identified file format identifier information agrees with the read out file format identifier information 181, it means that the data to be read out is stored somewhere in the block 162 of the file. Therefore, the related information read/write program 111 proceeds to Step S17, where it determines if the major version information contained in the file format version information 182 read out from the file header 161 of the file agrees with the major version information contained in its own file format version information 122 that is read out by the processing operation of Step S12 or not.

If it is determined in Step S17 that the major version information of the file and its own major version information agree with each other, it means that the data can be read out from the file. Therefore, the related information read/write program 111 proceeds to Step S18, where it reads out the block identifier information from the first piece of block arrangement information 184 of the file header 161 of the file.

In Step S19, the related information read/write program 111 determines if the block identifier information identified as a result of the processing operation of Step S11 and the block identifier information read out from the file header 161 of the file agree with each other or not. If it is determined that the two pieces of block identifier information do not agree with each other, the related information read/write program 111 proceeds to Step S20, where it reads out the block identifier information from the next block arrangement information 184. Then, it returns to Step S19 and repeats the processing operation of determining agreement or disagreement and that of reading out until it finds out that the identified block identifier information agrees with the read out block identifier information.

If, on the other hand, it is determined in Step S19 that the identified block identifier information agrees with the block identifier information read out from the file header 161 of the file, the related information read/write program 111 proceeds to Step S21, where it reads out the block position information from the block arrangement information 184, the block identifier information of which agrees with the identified block identifier information, because the data to be read out is stored in the block 162 that corresponds to the block arrangement information 184 from which the block identifier information is read out.

In Step S22, the related information read/write program 111 reads out the data from the block 162 of the file according to the read out block position information and ends the processing operation. In other words, in Step S22, the related information read/write program 111 controls the operation of reading data from the block 162 of the file according to the read out block position information. For example, since the number of bytes from the head of the file to the head of the block 162 is contained in the read out block position information, in Step S22, the related information read/write program 111 has the recording section 28 read out the desired data that is stored in the block 162 of the file storing the data to be read out.

If the file contains N blocks 162 and the data to be read out is stored in the i-th block 162, the related information read/write program 111 can quickly read out the desired data because it does not need to read out the contents of the (i−1)-th block 162 counted from the first block.

It may alternatively be so arranged that, in Step S21, the related information read/write program 111 reads out the block size information from the block arrangement information 184, of which the block identifier information agrees, along with the block position information, and in Step S22, reads out the data from the block 162 of the file according to the block position information and the block size information it reads out. With this arrangement, the related information read/write program 111 can reliably extract the entire block 162 that stores the data to be read out from the file and read the desired data from the extracted block 162.

If it is determined in Step S13 that the identified file format identifier information is not contained in its own file format identifier information, the related information read/write program 111 proceeds to Step S23, where it executes an error processing operation of displaying an error message on the output section 27 and ends the processing operation because it cannot handle the file storing the data to be read out.

If it is determined in Step S17 that the major version information of the file and its own major version information do not agree with each other, it means that the data cannot be read out from the file because the file whose major version information differs from its own major version information has a different structure and hence is not compatible. Therefore, the related information read/write program 111 proceeds to Step S23, where it executes an error processing operation of displaying an error message on the output section 27 and ends the processing operation because it cannot handle the file storing the data to be read out.

In this way, when the related information read/write program 111 reads out information relating to contents, it does not have to read the blocks 162 that do not store the information to be read out of the blocks 162 arranged in the file. In other words, the related information read/write program 111 can read only the information to be read from the block 162 that stores the information. Thus, the related information read/write program 111 can quickly read out information relating to contents if the information processing device has a relatively small processing capacity and the amount of information to be processed is relatively large.

Additionally, the related information read/write program 111 can extract the block 162 that stores the information to be read and read out the desired information from the extracted block 162 in Step S53. With this arrangement, it is possible to quickly read only necessary information out of a large volume of information relating to contents and utilize the read out information if the information processing device has a relatively small storage region and a relatively small processing capacity.

Figure 9:
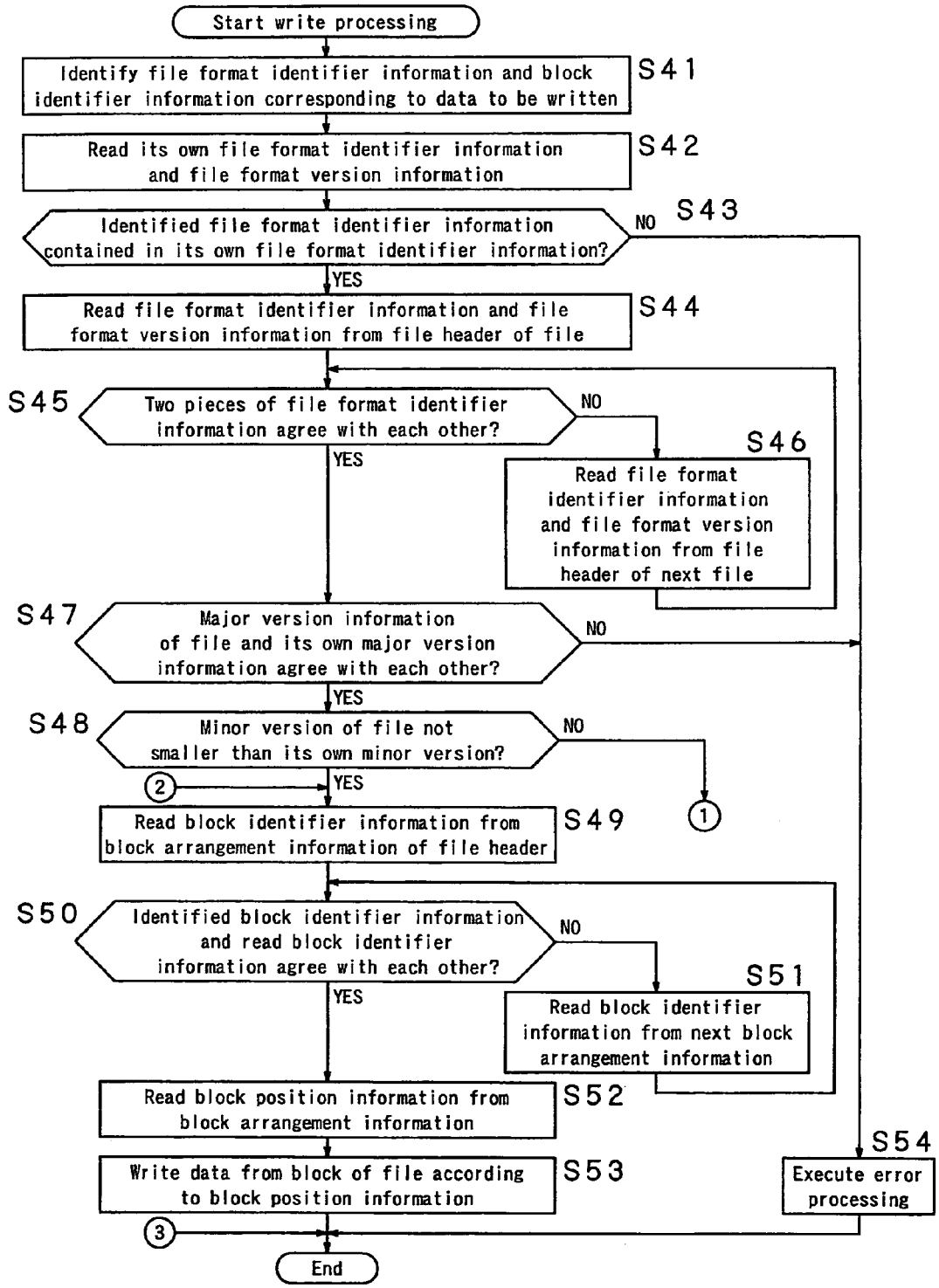
FIG. 9 is a flow chart of processing an operation of writing contents-related information.
Figure 10:
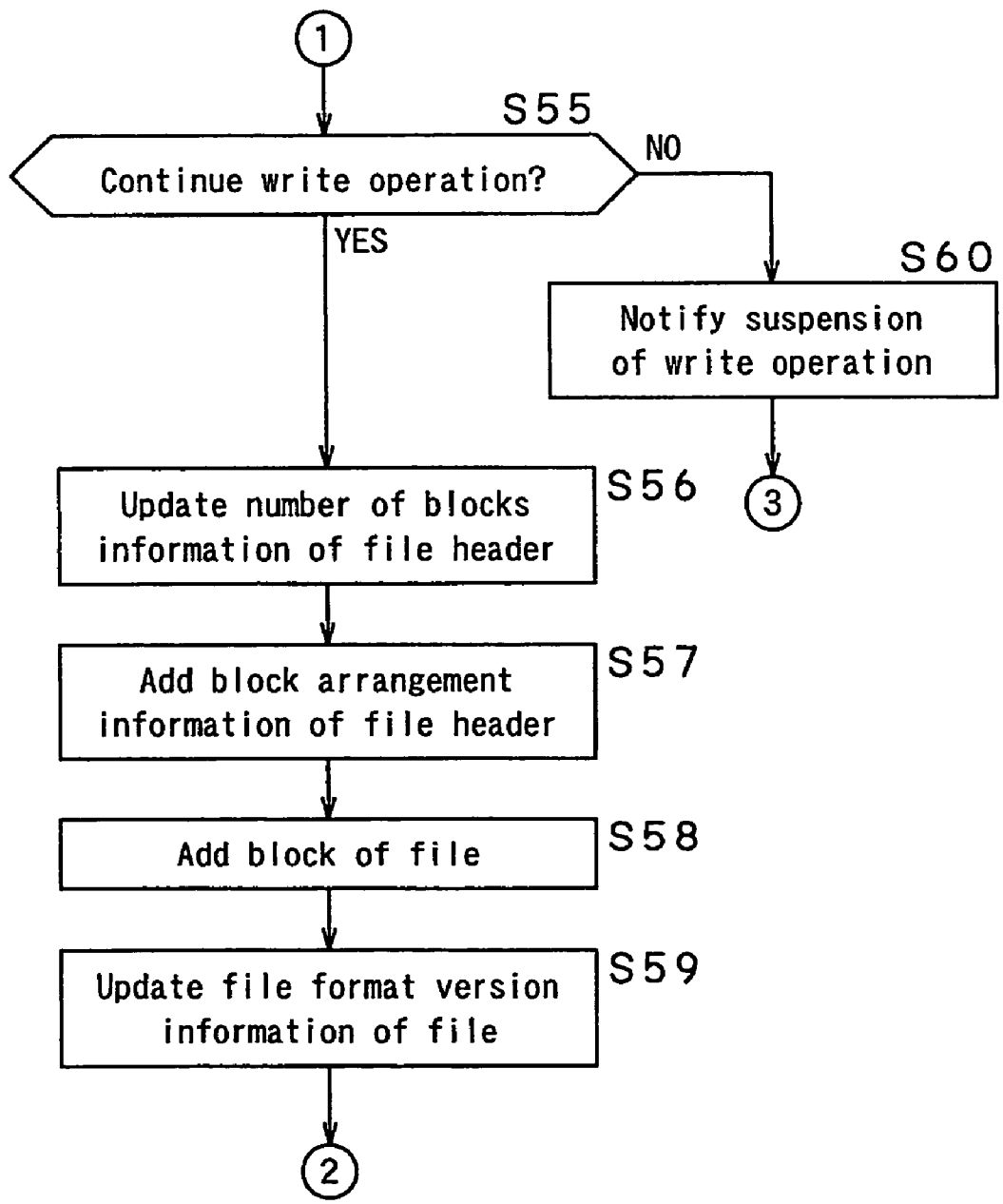
FIG. 10 is a flow chart of processing another operation of writing contents-related information.

Now, the processing operation for writing information relating contents will be described below. FIGS. 9 and 10 are flow charts of processing an operation of writing contents-related information by the CPU 21 that executes the file management program 101. In Step S41, the related information read/write program 111 of the file management program 101 identifies the file format identifier information and the block identifier information that correspond to the data to be written (contents-related information).

For example, the related information read/write program 111 stores in advance data that indicates the correspondence of the information relating to contents to the file format identifier information and the block identifier information so that it identifies the file format identifier information and the block identifier information that correspond to the data to be written according to the stored data.

In Step S42, the related information read/write program 111 reads out the file format identifier information and the file format version information stored in it. For example, the related information read/write program 111 may read out the file format identifier information 121-1 through 121-3 and the file format version information 122 in Step S42.

Then, in Step S43, the related information read/write program 111 determines if the file format identifier information identified by the processing operation of Step S41 is contained in the file format identifier information read out from itself in Step S42 or not. If it is determined in Step S43 that the identified file format identifier information is contained in its own file format identifier information, the related information read/write program 111 proceeds to Step S44, where it reads out the file format identifier information 181 and the file format version information 182 from the file header 161 of the first file because it can handle the file storing the data to be written.

Then in Step S45, the related information read/write program 111 determines if the file format identifier information identified by the processing operation of Step S41 agrees with the file format identifier information 181 read out from the file or not. If it is determined that they do not agree with each other, the related information read/write program 111 proceeds to Step S46, where it reads out the file format identifier information 181 and the file format version information 182 from the file header 161 of the next file because the data to be written cannot be stored in the file. Then, the related information read/write program 111 returns to Step S45 and repeats the processing operation of determining agreement or disagreement and that of reading out until it find out that the identified file format identifier information agrees with the read out file format identifier information 181.

If it is determined in Step S45 that the identified file format identifier information agrees with the read out file format identifier information 181, it means that the data to be written can be stored in the file. Therefore, the related information read/write program 111 proceeds to Step S47, where it determines if the major version information contained in the file format version information 182 read out from the file header 161 of the file agrees with the major version information contained in its own file format version information 122 that is read out by the processing operation of Step S42 or not.

If it is determined in Step S47 that the major version information of the file and its own major version information agree with each other, it means that the related information read/write program 111 can handle the file. Therefore, it proceeds to Step S48, where it determines if the minor version information of the file is smaller than its own minor version or not according to the minor version information contained in the file format version information 182 read out from the file header 161 of the file and the minor version information contained in its own file format version information 122 that is read out in Step S42.

If it is determined in Step S48 that the minor version of the file is not smaller than its own minor version, it means that the data can be written to the file. Therefore, the related information read/write program 111 proceeds to Step S49, where it reads out the block identifier information from the first piece of block arrangement information 184 of the file header 161 of the file.

In Step S50, the related information read/write program 111 determines if the block identifier information identified as a result of the processing operation of Step S41 and the block identifier information read out from the file header 161 of the file agree with each other or not. If it is determined that the two pieces of block identifier information do not agree with each other, the related information read/write program 111 proceeds to Step S51, where it reads out the block identifier information from the next block arrangement information 184. Then, it returns to Step S50 and repeats the processing operation of determining agreement or disagreement and that of reading out until it finds out that the identified block identifier information agrees with the read out block identifier information.

If, on the other hand, it is determined in Step S50 that the identified block identifier information agrees with the block identifier information read out from the file header 161 of the file, the related information read/write program 111 proceeds to Step S52, where it reads out the block position information from the block arrangement information 184, the block identifier information of which agrees with the identified block identifier information, because the data can be written to the block 162 that corresponds to the block arrangement information 184 from which the block identifier information is read out.

In Step S53, the related information read/write program 111 writes the data to the block 162 of the file according to the read out block position information and ends the processing operation. In other words, in Step S53, the related information read/write program 111 controls the operation of writing data to the block 162 of the file according to the read out block position information. For example, since the number of bytes from the head of the file to the head of the block 162 is contained in the read out block position information, in Step S53, the related information read/write program 111 has the recording section 28 write the data to be written to the block 162 of the file for storing the data to be written.

If the file contains N blocks 162 and the data to be written is to be stored in the i-th block 162, the related information read/write program 111 can quickly write the desired data because it does not need to operate (e.g., read the contents of and/or confirm the data volume of) the (i−1)-th block 162 counted from the first block.

It may alternatively be so arranged that, in Step S52, the related information read/write program 111 reads out the block size information from the block arrangement information 184, of which the block identifier information agrees, along with the block position information, and in Step S53, writes the data to the block 162 of the file according to the block position information and the block size information it reads out. With this arrangement, the related information read/write program 111 can reliably recognize the size of the entire block 162 for storing the data to be written and write the desired data to the block 162.

If it is determined in Step S43 that the identified file format identifier information is not contained in its own file format identifier information, the related information read/write program 111 proceeds to Step S54, where it executes an error processing operation of displaying an error message on the output section 27 and ends the processing operation because it cannot handle the file for storing the data to be written.

If it is determined in Step S47 that the major version information of the file and its own major version information do not agree with each other, it means that the data cannot be written to the file because the file whose major version information differs from its own major version information has a different structure. Therefore, the related information read/write program 111 proceeds to Step S53, where it executes an error processing operation of displaying an error message on the output section 27 and ends the processing operation.

If, on the other hand, it is determined in Step S48 that the minor version of the file is not greater than its own minor version, it means that the data cannot be written to the file directly. Therefore, the related information read/write program 111 proceeds to Step S55, where it determines if the operation of writing the data is to be continued or not according to the signal from the input section 26 that corresponds to the user operation. If it is determined in Step S55 that the operation of writing the data is to be continued, it is necessary to carry out a version up of the file so that the related information read/write program 111 proceeds to Step S56, where it updates the number of blocks information 183 of the file header 161.

For example, in Step S56, the related information read/write program 111 may update the number of blocks information 183 of the file header 161, which is currently "1", to "2".

In Step S57, the related information read/write program 111 adds block arrangement information 184 that contains the number corresponding to the update of the number of blocks information 183 to the file header 161. For example, if the number of blocks information 183 of the file header 161, which is currently "1", is updated to "2", the related information read/write program 111 adds block arrangement information 184 for 1 to the file header 161.

Then, in Step S58, the related information read/write program 111 adds a number of blocks 162 that corresponds to the update of the number of blocks information 183. For example, if the number of blocks information 183 of the file header 161, which is currently "1", is updated to "2", the related information read/write program 111 adds a block 162 to the file.

It may alternatively be so arranged that, in Step S58, the related information read/write program 111 adds a region for storing contents-related information in the free region of the block 162 that is already arranged in the file with or without adding the block 162 to a file.

If the size of the existing blocks 162 is changed, the related information read/write program 111 updates the block position information and the block size information of the block arrangement information 184 whenever necessary.

Then, in Step S59, the related information read/write program 111 updates the file format version information 182 of the file and proceeds to Step S49, where it specifies the block 162 where the data is to be written and executes an operation of writing the data before it ends the processing operation.

For example, in Step S59, the related information read/write program 111 may update the file format version information 182 by overwriting the file format version information 122 on the file format version information 182 of the file.

In other words, as a result of the version up processing operation for the file in Steps S56 through S59, a block 162 is added to the file so that it is possible to store contents-related information that cannot be stored so far.

Differently stated, the version up processing operation of minor version for the file in Steps S56 through S59 is an operation of changing the file format that takes lower compatibility into consideration.

A change to the file format that takes lower compatibility into consideration includes changing the file format by adding a new block 162 to the file to change the number of blocks 162 and the configuration of the blocks 162 (the type and the arrangement of the stored data) that are defined by the file format identifier information 181 and the file format version information 182 and changing the file format by extending the data structure of the block-dependent information of the existing blocks 162, using the data region that is secured as unused region in the block-dependent information.

A change to the file format is carried out without considering lower compatibility in a version up of increasing the numerical value of the major version information. A change without considering lower compatibility is a change to the data structure of the file format that is not related to the above-described minor version up.

As described above, file formats having identical file format identifier information 181 and different numerical values for the major version information are not compatible in terms of data structure. On the other hand, file formats having identical file format identifier information 181 and a same numerical value for the major version information but different numerical values for the minor version information are compatible in terms of data structure. In such a case, the data structure of the block-dependent information of the blocks 162 contained in the file format having a larger numerical value for the minor version information takes over all the data structure of the used data region (the region that stores data) of the block-dependent information of the blocks 162 contained in the file format having a smaller numerical value for the minor version information.

Note that the processing operation of Steps S56 through S59 can be realized typically by describing the procedures in the related information read/write program 111 for each version and file format identifier information 121.

Alternatively, the related information read/write program 111 may carry out the processing operation of Steps S56 through S59 by recording the data indicating the file structure for each version and file format identifier information 121 and referring to the file structure indicated by the data. For example, the number of blocks arranged in the file that is identified by the version and the file format identifier information 121 and the arrangement of information in each block 162 are described in the data indicating the file structure so that the related information read/write program 111 carries out the processing operation of Step S56 by determining the difference in the number of blocks 162 before and after the version up and then the processing operation of Steps S57 and S58 by identifying the block 162 that does not exist before the version up and hence has to be arranged after the version up.

Figure 11:
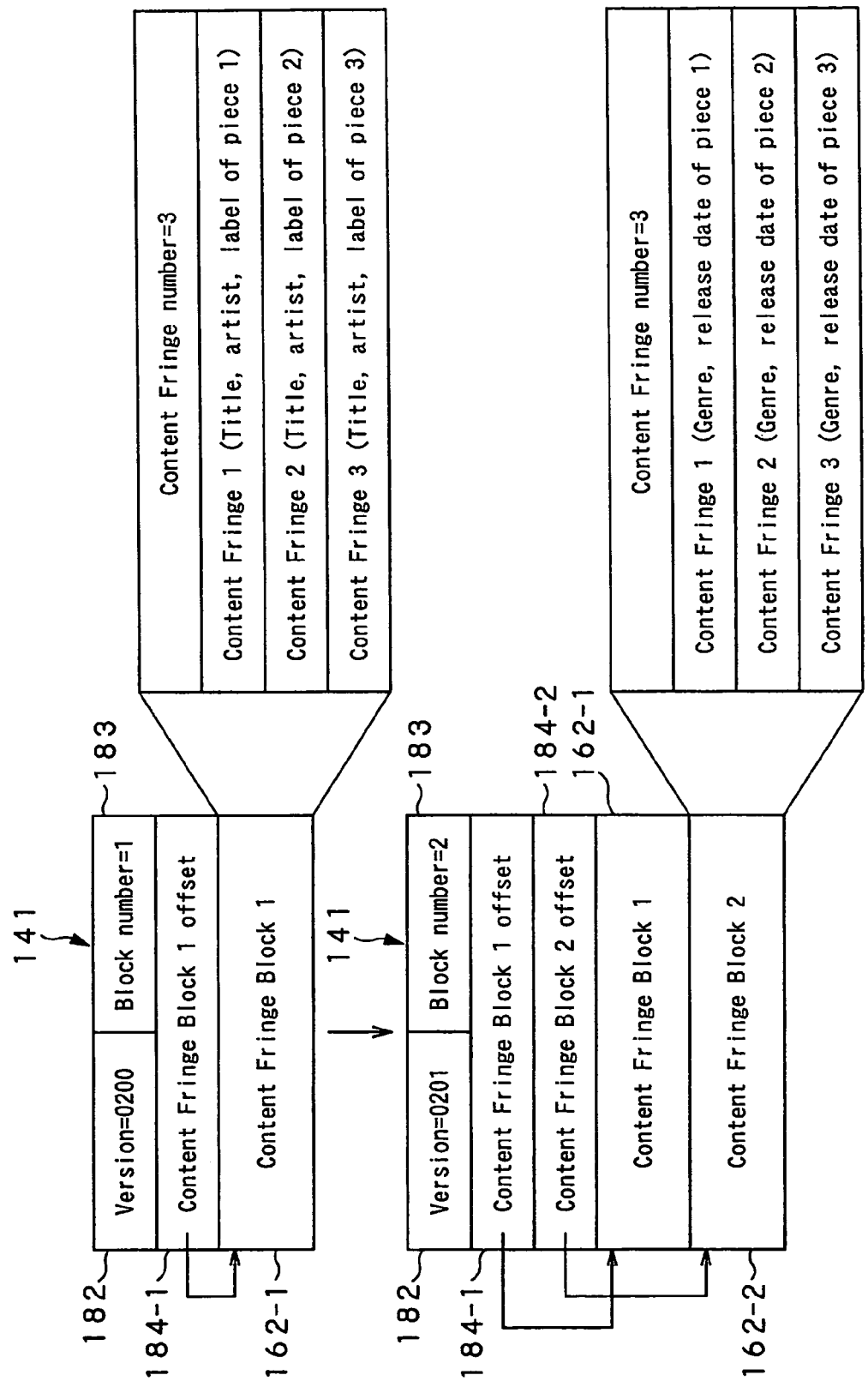
FIG. 11 is a schematic illustration of an example of file version up.
Figure 12:
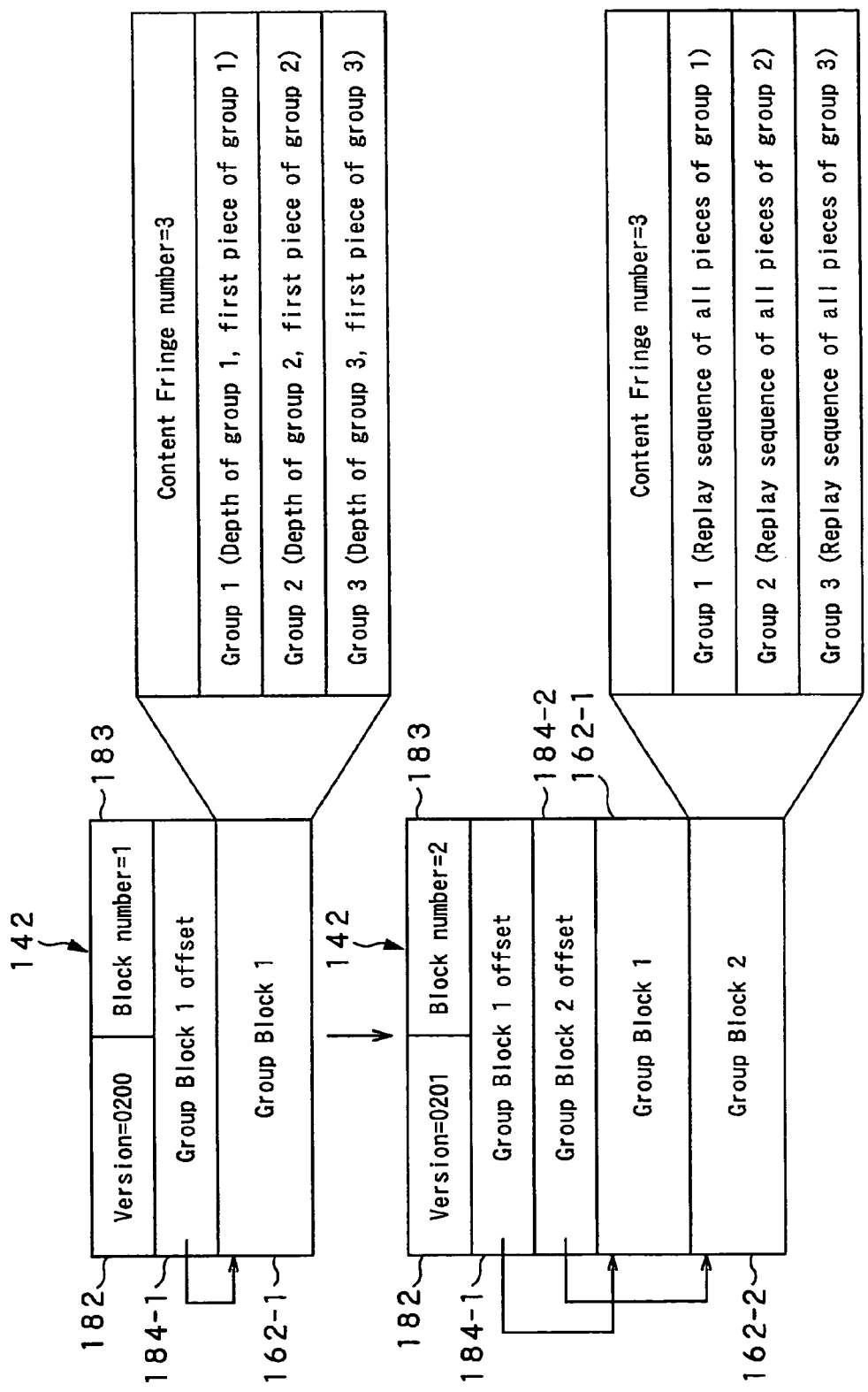
FIG. 12 is a schematic illustration of another example of file version up.
Figure 13:
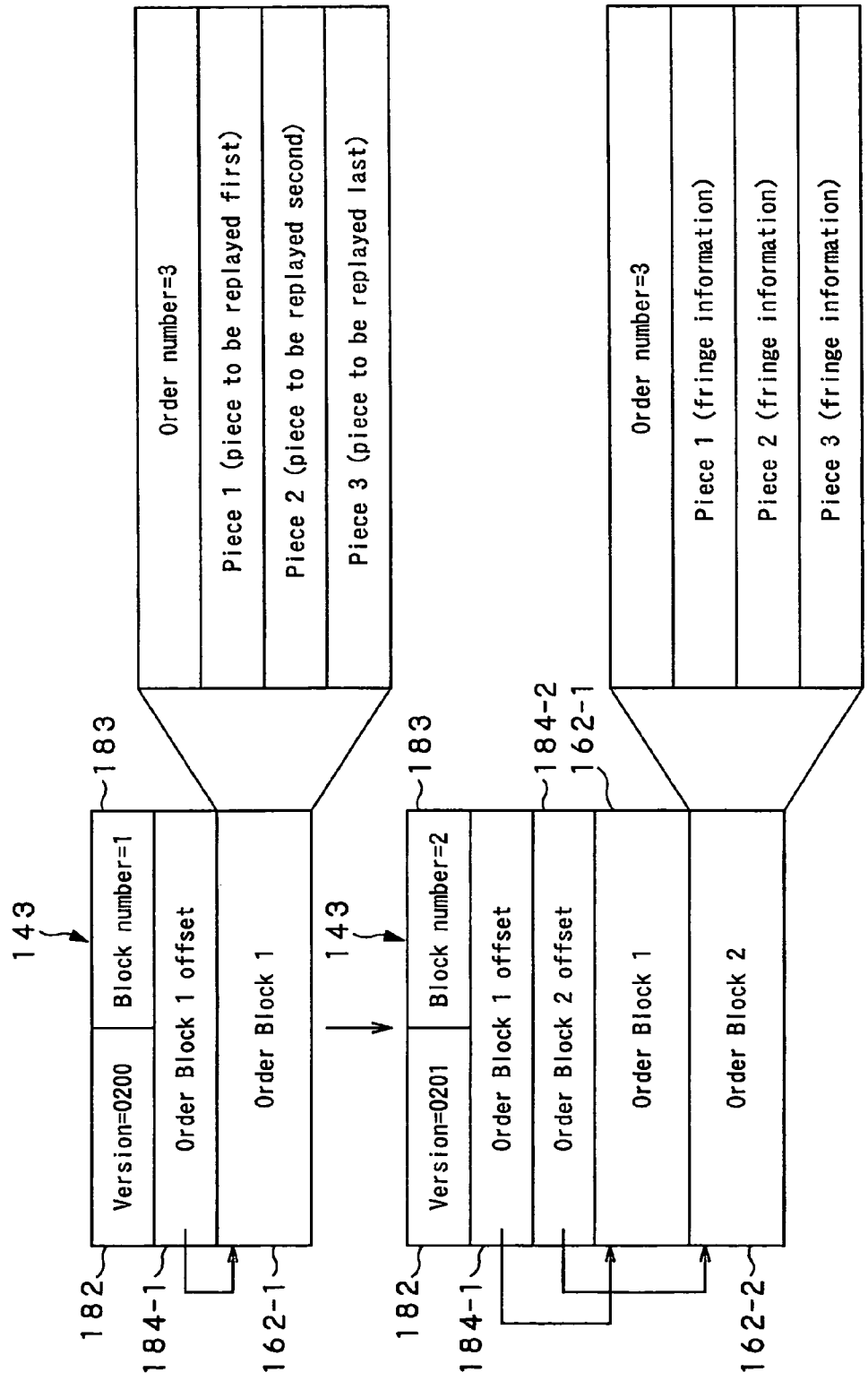
FIG. 13 is a schematic illustration of still another example of file version up.

FIGS. 11 through 13 schematically illustrate examples of file version up.

Referring to FIG. 11, a version up can be realized for the contents fringe file 141, in which the block 162-1 that is a contents fringe block storing the titles of the pieces of music, the names of the artists and the labels, by adding a block 162-2 that is a contents fringe block storing the genres of the pieces of music and the release dates.

For example, sets of pieces of contents-related information including the titles of three pieces of music, the names of the artists and the labels may be stored in the block 162-1 as block-dependent information of the block 162-1 along with the number of sets of pieces of contents-related information (contents fringe number in FIG. 11), which is equal to "3". Additionally, sets of pieces of contents-related information including the genres of the three pieces of music and the release dates may be stored in the block 162-2 as block-dependent information of the block 162-2 along with the number of sets of pieces of contents-related information, which is also equal to "3".

In such a case, the number of blocks information 183 of the file header 161, which is equal to "1", is updated to "2" and block arrangement information 184-2 that indicates the arrangement of the block 162-2 is added to the contents fringe file 141 as a result of the version up. Additionally, the file format version information 182 of the file header 161, which is "0200", is updated to "0201" as a result of the version up. Note that the two upper order digits "02" of the file format version information 182 represent the major version information and the two lower order digits "00" or "01" of the file format version information 182 represents the minor version information.

The bock 162-1 of the contents fringe file 141 and the block arrangement information 184-2 that indicates the arrangement of the block 162-1 are not updated.

While the contents fringe file 141 cannot store the genres of the pieces of music and the release dates before the version up, it can now store the genres of the pieces of music and the release date as a result of the version up.

As shown in FIG. 12, for example, a version up may be realized for the group tree file 142 as a result of adding a block 162-2 that is a block for storing the sequence of replaying all the pieces of music that belong to the groups to the group tree file 142, in which the block 162-1 that is the group block storing the depths of the groups and the first pieces of music of the groups are arranged before the version up.

For example, for each of three groups, contents-related information including the depth of the group and the first piece of music of the group may be stored in the block 162-1 as block-dependent information of the block 162-1 along with the number of sets of pieces of contents-related information, which is equal to "3". Additionally, for example, for each of the three groups, contents-related information including the sequence of replaying all the pieces of music that belong to the group may be stored in the block 162-2 as block-dependent information of the block 162-2 along with the number of sets of pieces of contents-related information, which is equal to "3".

In such a case, the number of blocks information 183 of the file header 161, which is equal to "1", is updated to "2" and block arrangement information 184-2 that indicates the arrangement of the block 162-2 is added to the group tree file 142.

The bock 162-1 of the group tree file 142 and the block arrangement information 184-2 that indicates the arrangement of the block 162-1 are not updated.

While the group tree file 142 cannot store the sequence of replaying all the pieces of music that belong to each group before the version up, it can now store the sequence of replaying all the pieces of music that belong to each group as a result of the version up.

As shown in FIG. 13, for example, a version up may be realized for the replay sequence file 143 as a result of adding a block 162-2 that is an order block for storing the fringe information indicating the piece of music that is replayed first, the fringe information indicating the piece of music that is replayed second and the fringe information indicating the piece of music that is replayed last is added to the replay sequence file 143, in which the block 162-1 that is the order block storing information for identifying the piece of music to be replayed first, information for identifying the piece of music to be replayed second and information for identifying the piece of music to be replayed last before the version up.

For example, contents-related information indicating the sequence of replaying the three pieces of music may be stored in the block 162-1 as block-dependent information of the block 162-1 along with the number of pieces of contents-related information, which is equal to "3". Additionally, for example, contents-related information, which is fringe information on the pieces of music, may be stored in the block 162-2 as block-dependent information of the block 162-2 along with the number of pieces of contents-related information, which is equal to "3".

In such a case, the number of blocks information 183 of the file header 161, which is equal to "1", is updated to "2" and block arrangement information 184-2 that indicates the arrangement of the block 162-2 is added to the group tree file 142.

The bock 162-1 of the replay sequence file 143 and the block arrangement information 184-2 that indicates the arrangement of the block 162-1 are not updated.

While the replay sequence file 143 cannot store the fringe information on the pieces of music before the version up, it can now store the fringe information on the pieces of music as a result of the version up.

Now, returning to FIG. 10, if it is determined in Step S55 that the operation of writing the data is not to be continued, the related information read/write program 111 causes the output section 27 to display a message for suspending the data writing operation and ends the processing operation.

As described above, when the related information read/write program 111 writes contents-related information, it can write the information to the block 162 for storing the information without reading the blocks 162 that do not store the information to be written out of the blocks 162 arranged in the file. Therefore, it can write contents-related information quickly if the information processing device has a relatively small processing capacity and the amount of information to be processed is relatively large.

Thus, according to the invention, it is possible to extend with ease the format of the file into which contents-related information is to be stored without realizing a version up of the firmware of the information processing device for handling contents.

Therefore, it is possible to read or write contents-related information when contents-related information is stored in a file. Additionally, it is possible to read contents-related information quickly if the information processing device has a relatively small processing capacity and the amount of information to be processed is relatively large when it is so arranged that the records of files containing a predetermined number of blocks that are identified by a version and in which related information and block identifying information are arranged and version information for identifying versions, block position information indicating the positions of blocks and file format identifying information indicating that at least one of the blocks is contained are controlled and the file format identifying information and the block identifying information corresponding to the related information to be read out are identified, while if the version information read out from the file identified by the file format identifying information and the predefined version determining information agree with each other or not is determined and the related information are read out from the block identified by the block identifying information of the identified file according to the block position information of the identified file when the version information and the version determining information are determined to agree with each other.

Furthermore, it is possible to read contents-related information quickly if the information processing device has a relatively small processing capacity and the amount of information to be processed is relatively large when a predetermined number of blocks that are identified by a version and in which related information and block identifying information are arranged and version information for identifying versions, block position information indicating the positions of blocks and file format identifying information indicating that at least one of the blocks is contained are arranged in contents-related information and it is so arranged that the file format identifying information and the block identifying information corresponding to the related information to be read out are identified and if the version information read out from the file identified by the file format identifying information and the predefined version determining information agree with each other or not is determined so that the related information are read out from the block identified by the block identifying information of the identified file according to the block position information of the identified file when the version information and the version determining information are determined to agree with each other.

The above-described series of processing operations may be executed by means of hardware or software. When the series of processing operations are executed by means of software, the computer program of the software is installed from a recording medium into a computer that is incorporated to dedicated hardware or a general-purpose computer that is adapted to execute various functions features when various computer programs are installed.

The recording medium will be delivered to the user in order to provide the user with the computer program apart from a computer. The computer program may be recorded in a package media that may comprise a magnetic disc 51 (which may be a flexible disc), an optical disc 52 (CD-ROM (compact disc-read only memory)) or a DVD (digital versatile disc)), a magneto-optical disc 53 (MD (Mini-Disc): tradename) and/ or a semiconductor memory 54. Alternatively, the recording medium may comprise a ROM 22 or a hard disc contained in the recording section 28 that stores the computer program in advance and incorporated into a computer before it is provided to the user.

If necessary, the computer program for executing the above described series of processing operations may be installed into a computer by way of an interface such as a router and/or a modem or by way of wired or radio communication mediums that may include a local area network, Internet and one or more than one digital satellites.

The processing steps of the computer program stored in a recording medium may be executed in time series according to the described sequence, in parallel or independently.

What is claimed is:

1. An information processing device for processing content and a related information file relating to the content, the device comprising:
   a memory for storing the related information file, the related information file comprising:
   file format identifying information identifying the a file format of the related information file;
   file version information indicating a version of the related information file, the file version information comprising a first piece of the file version information and a second piece of the file version information, wherein the second piece of the file version information indicates a change to the file format that is smaller than the change indicated by the first piece of the file version information;
   one or more information blocks;
   number of information blocks information indicating the a number of the information blocks;
   block identifying information identifying the information blocks; and
   block position information indicating the position of the information blocks, the information blocks comprising block identifying information for identifying the block itself; and
   a processor for:
   determining agreement or disagreement of the file version information and a file version determining information at the time of writing to the related information file, wherein the file version determining information is predefined in the information processing device at the time of reading the related information file, wherein the file version determining information comprises a first piece of the file version determining information and a second piece of the file version determining information, and wherein determining agreement or disagreement of the file version information and the file version determining information comprises determining agreement or disagreement of the first piece of the file version information and the first piece of the file version determining information, and
   controlling reading of the related information file according to the block identifying information or the block position information upon determining agreement of the file version information and the file version determining information,
   wherein the processor determines agreement or disagreement of the file version information and the file version determining information only upon determining agreement of the file format identifying information and a file format identifying determining information,
   wherein the processor controls writing to the related information file according to the block identifying information or the block position information upon determining agreement of the file version information and the file version determining information, and
   wherein the processor adds the information block and block position information indicating the position of the information block to the related information file and updates the related information file by updating the file version information when it is determined that the file version information and the file version determining information do not agree with each other.

2. The device according to claim 1, wherein the processor determines agreement or disagreement of the second piece of the file version information and the second piece of the file version determining information; and
   wherein the processor updates the related information file upon determining agreement of the first piece of the file version information and the first piece of the file version determining information and disagreement of the second piece of the file version information and the second piece of the file version determining information.

3. The device according to claim 1, wherein determining agreement or disagreement of the file version information and the file version determining information further comprises determining whether the second piece of the file version information is smaller than the second piece of the file version determining information.

4. An information processing method of an information processing device for processing content and a related information file relating to the content;
   the related information file comprising:
   file format identifying information for identifying the a file format of the related information file;
   file version information indicating a version of the related information file, the file version information comprising a first piece of the file version information and a second piece of the file version information, wherein the second piece of the file version information indicates a change to the file format that is smaller than the change indicated by the first piece of the file version information;
   one or more information blocks;
   number of information blocks information indicating a number of the information blocks;
   block identifying information identifying the information blocks; and block position information indicating the position of the information blocks, the information blocks comprising block identifying information for identifying the block itself;
   the method comprising:
   determining agreement or disagreement of the file version information and a file version determining information at the time of writing to the related information file, wherein the file version determining information is predefined in the information processing device at the time of reading the related information file, wherein the file version determining information comprises a first piece of the file version determining information and a second piece of the file version determining information, and wherein determining agreement or disagreement of the file version information and the file version determining information comprises determining agreement or disagreement of the first piece of the file version information and the first piece of the file version determining information; and reading the related information file according to the block identifying information or the block position information contained in the related information file upon determining agreement of the file version information and the file version determining information, wherein the processor determines agreement or disagreement of the file version information and the file version determining information only upon determining agreement of the file format identifying information and a file format identifying determining information, wherein the processor controls writing to the related information file according to the block identifying information or the block position information upon determining agreement of the file version information and the file version determining information, and wherein the processor adds the information block and block position information indicating the position of the information block to the related information file and updates the related information file by updating the file version information when it is determined that the file version information and the file version determining information do not agree with each other.

5. A computer-readable recording medium storing a program for causing a computer to execute an information processing method for processing content and a related information file relating to the content;

the related information file comprising:

file format identifying information identifying a file format of the related information file;

file version information indicating a version of the related information file, the file version information comprising a first piece of the file version information and a second piece of the file version information, wherein the second piece of the file version information indicates a change to the file format that is smaller than the change indicated by the first piece of the file version information;

one or more information blocks;

number of information blocks information indicating the number of the information blocks;

block identifying information identifying the information blocks; and block position information indicating the position of the information blocks, the information blocks comprising block identifying information for identifying the block itself;

the method comprising:

determining agreement or disagreement of the file version information and a file version determining information at the time of writing to the related information file, wherein the file version determining information is predefined in the information processing device at the time of reading the related information file, wherein the file version determining information comprises a first piece of the file version determining information and a second piece of the file version determining information, and wherein determining agreement or disagreement of the file version information and the file version determining information comprises determining agreement or disagreement of the first piece of the file version information and the first piece of the file version determining information; and reading the related information file according to the block identifying information or the block position information contained in the related information file upon determining agreement of the information and the determining information, wherein the processor determines agreement or disagreement of the file version information and the file version determining information only upon determining agreement of the file format identifying information and a file format identifying determining information, wherein the processor controls writing to the related information file according to the block identifying information or the block position information upon determining agreement of the file version information and the file version determining information, and wherein the processor adds the information block and block position information indicating the position of the information block to the related information file and updates the related information file by updating the file version information when it is determined that the file version information and the file version determining information do not agree with each other.

* * * * *

UNITED STATES PATENT AND TRADEMARK OFFICE
CERTIFICATE OF CORRECTION

PATENT NO. : 7,676,504 B2
APPLICATION NO. : 10/969556
DATED : March 9, 2010
INVENTOR(S) : Masahiro Shimizu, Manabu Kii and Takamichi Hayashi It is certified that error appears in the above-identified patent and that said Letters Patent is hereby corrected as shown below:

In claim 1, column 23, line 31, "indentifying the a" should read --identifying a--

In claim 1, column 23, line 41, "indicating the a" should read --indicating a--

In claim 1, column 23, line 45, "indicating the position" should read --indicating a position--

In claim 4, column 24, line 41, "identifying the a" should read --identifying a--

In claim 4, column 24, line 54, "indicating the" should read --indicating a--

In claim 5, column 25, line 44, "indicating the" should read --indicating a--

In claim 5, column 26, line 3, "indicating the position" should read --indicating a position--

Signed and Sealed this

Twenty-ninth Day of June, 2010

David J. Kappos
*Director of the United States Patent and Trademark Office*